G. L. PATTERSON.
BATTERY AND HOLDER THEREFOR.
APPLICATION FILED MAY 26, 1908.
924,573.
Patented June 8, 1909.
2 SHEETS—SHEET 2.
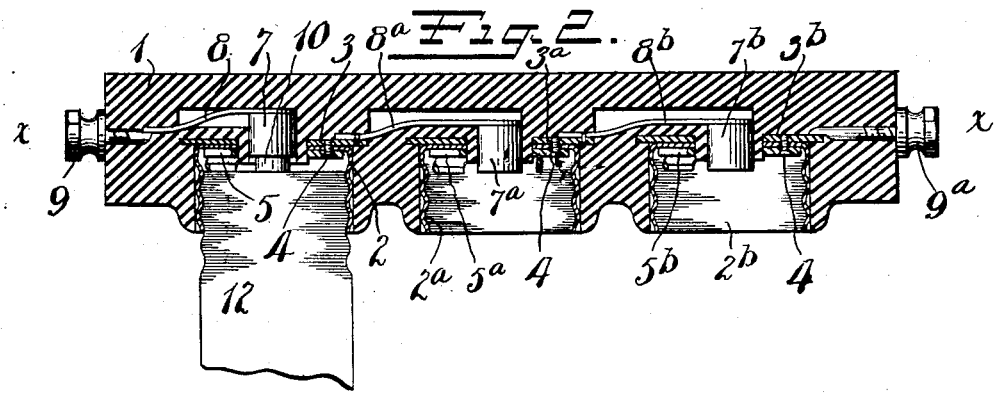
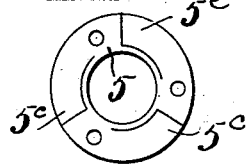
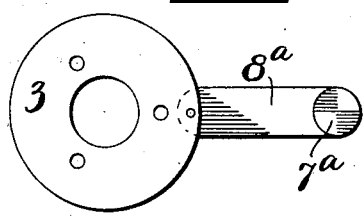
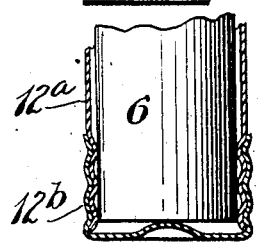
Witnesses:
Inventor
G. L. PATTERSON
By his Attorneys GEORGE LEWIS PATTERSON, OF NEW YORK, N. Y., ASSIGNOR TO ALICE C. PATTERSON, OF NEW YORK, N. Y.

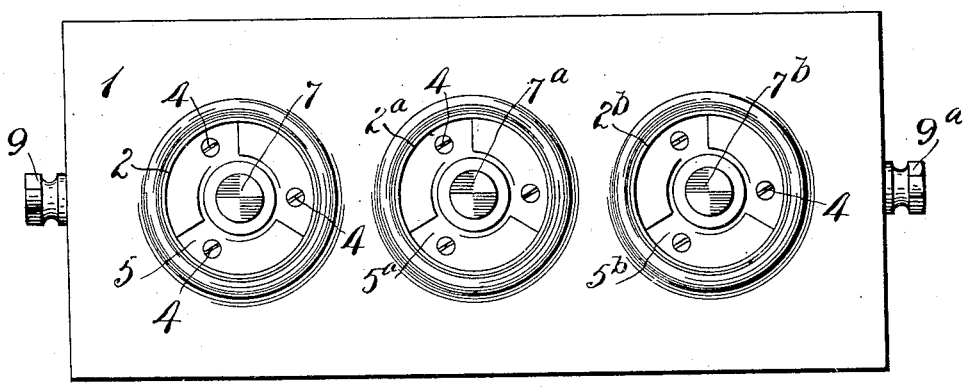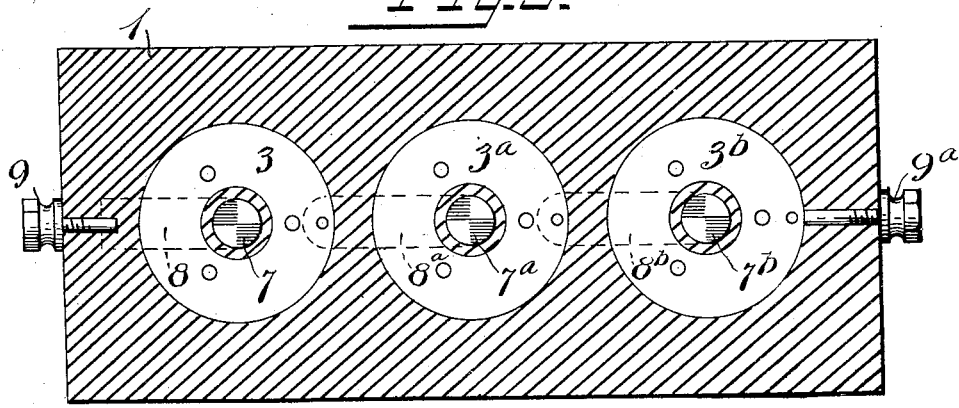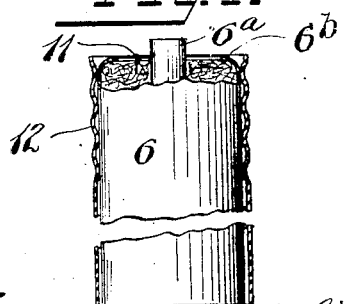

BATTERY AND HOLDER THEREFOR.

No. 924,573.     Specification of Letters Patent.     Patented June 8, 1909.

Application filed May 26, 1908. Serial No. 435,125.

*To all whom it may concern:*

Be it known that I, GEORGE L. PATTERSON, a citizen of the United States, residing at New York, county and State of New York, have invented certain new and useful Improvements in Batteries and Holders Therefor, of which the following is a full, clear, and exact description.

My invention relates to improvements in batteries and holders therefor, this invention being essentially an improvement on the invention set forth in Patent No. 705,919, dated July 29, 1902.

The object of the present invention is to provide a simple and effective means for both mechanically and electrically connecting a battery to a holder, the latter providing improved terminal blocks of simple and very effective construction.

In the accompanying drawings, Figure 1 is a plan view of the under side of the battery holder element; Fig. 2 is, in the main, a longitudinal section thereof. Fig. 3 is a section thereof on the plane of the line X—X of Fig. 2. Fig. 4 is a side elevation of a battery and case therefor, the former being partly in section. Fig. 5 is an edge elevation of a detail. Fig. 6 is a plan view of the same detail. Fig. 7 is a plan view of another detail. Fig. 8 is a section of a modification.

The battery holder comprises the insulating head or carrier 1, preferably made of suitable insulating material and, if desired, of a molded insulating compound.

2 $2^a$ $2^b$ are threaded sockets rigidly secured to bed-plates 3 $3^a$ $3^b$, the latter being permanently secured in the head 1. The sockets 2 $2^a$ $2^b$ are each adapted to support a single unit and, as shown, are threaded, the base of each of said sockets, respectively, being secured to its respective bed-plate through the medium of suitable fastenings, such as screws or rivets 4.

5 $5^a$ $5^b$ are combined socket reinforcing washers and spring terminal members arranged to make contact with the electrode 6 of the battery. One of these spring contact washers 5 is shown in Figs. 5 and 6 and will be seen to include integral spring contact arms.

7 $7^a$ $7^b$ are center terminals. The terminal 7 is preferably yielding and mounted on the connector strip 8 leading to binding post 9. The connector strip $8^a$ electrically connects the member 5 with the center terminal $7^a$ of the next socket. Strip $8^b$ electrically connects the member $5^2$ with terminal $7^b$. The member $5^b$ is electrically connected with binding post $9^a$.

10 is the center electrode of the battery cell. The cupped portion of the cell, which constitutes the electrode 6, is preferably spun over or turned in at its upper edge, as shown at $6^b$, to form a proper contact bearing for engagement with the spring contact arms of its terminal member 5 $5^a$ or $5^b$. This turned in edge $6^b$ also serves to retain in place the material 11 used to seal the battery cell.

As will now be seen each socket has two terminal pieces 5 and 7 attached thereto, and each cell, being fitted to each socket, will have two electrodes adapted to make electrical contact with said socket terminals. The means for securing each cell in its respective socket is a detachable container 12 arranged to neatly fit upon the cell and protect the same. Each container 12 is suitably shaped to be detachably connected with one of the sockets 2 $2^a$ $2^b$ so that when a battery cell is placed in said container and the latter is secured to its respective socket member 2 $2^a$ or $2^b$ the electrodes of the battery cell will be brought into electrical connection with the two opposite terminals of said socket, and these terminals being in turn in circuit thereby, couple the battery and circuit. While broadly this form of construction is dominated by the aforesaid patent, the present improvement has certain advantages in that it avoids the necessity of screw-threading the cell proper, and of relying upon a circuit connection made through the mechanical connection. Although in the present case if the battery cell is not insulated from the container, and the latter be made of suitable conducting material, obviously part of the current would go through the wall of the container and the socket members 2 $2^a$ or $2^b$. In any event, superior electrical connection is effected. In the construction of the battery, the turned over edge of the cell at the sealed in end furnishes a broad, smooth contact surface, as well as a retaining means for the sealing material above referred to. By having separate containers 12 for the battery cells it permits of the latter being made of polished material to furnish a handsome appearance, or, if desired, said containers may be made ornamental. Furthermore, any salts creeping out of the battery will be collected within the container instead of dripping to the floor. In these respects this improved construction has certain advantages not comprehended by the aforesaid patent.

In Fig. 8 I have shown the part $12^a$ corresponding to the part 12 in the previous views, save that in this instance the lower end $12^b$ is removable, being in the form of a screw-threaded cap.

In the modification shown in Fig. 8, the part $12^a$ may be said to constitute a part of the socket, since it is merely an extension thereof. In the event a long socket-like member is thus employed, one of the two socket terminals might extend to the lower end thereof, so that the actual contact would be made with the lower end of the cell 6, as shown at $12^c$. No additional illustration is necessary, because the parts $12^a$ $12^b$ might be made of conducting material, in which event these parts themselves would act as one terminal extension. Where one of the socket terminals makes connection with one electrode at the upper end of the cell, and the other terminal of the socket makes connection with the other electrode of the cell at the lower end, as shown in Fig. 8, it is preferable to have the said lower connection yielding, as would result from recessing the parts, as indicated in said Fig. 8 at $12^c$, said recess or depressed portion affording sufficient spring to provide a most satisfactory electrical contact. In this event, indeed, the upper contact 7—$7^a$ or $7^b$ might be made rigid; in fact, in some instances it might be preferable to have all the contacts rigid.

This battery and holder may be used with any suitable form of translating device, since the same constitutes no part of the socket or terminal connections. For this reason no translating device has been shown.

What I claim is:

1. A socket and two terminal pieces attached thereto, in combination with a battery cell adapted to said socket and having electrodes adapted for electrical connection with said socket terminals respectively, and means detachable from the battery cell for securing said cell in said socket said means electrically connecting one of said cell electrodes with its respective socket terminal.

2. A socket, two terminal pieces adapted thereto, in combination with a battery cell adapted to said socket and having electrodes at one end adapted to make contact with said socket terminals respectively, and means for securing said cell in said socket comprising a cell container of conducting material electrically connected with both the cell and socket and means for detachably securing said cell container in said socket.

3. A socket and two terminal pieces attached thereto, in combination with a battery cell adapted to said socket and having electrodes adapted to make contact with said socket terminals respectively, and means aside from said cell for securing the latter in said socket, one of said terminals being electrically connected with one end of said cell, the other terminal being electrically connected with the opposite end of said cell.

GEORGE LEWIS PATTERSON.

Witnesses:
R. C. MITCHELL,
CHAS. A. PEARD.